United States Patent [19]

Yang

[11] 4,454,937
[45] Jun. 19, 1984

[54] CLUTCH-BRAKE DEVICE

[76] Inventor: Long S. Yang, No. 14-1, Pu Ting Rd., Hsin Tsu City, Taiwan

[21] Appl. No.: 283,287

[22] Filed: Jul. 14, 1981

[51] Int. Cl.³ .................. B60K 41/24; F16D 41/07
[52] U.S. Cl. .................. 192/12 B; 192/18 R; 192/43; 192/47; 192/48.92
[58] Field of Search .................. 192/18 R, 12 B, 12 R, 192/43.2, 47, 43, 45.1, 48.92, 51, 71, 93 C; 188/82.2, 82.3, 82.8, 343

[56] References Cited

U.S. PATENT DOCUMENTS

| | | | |
|---|---|---|---|
| 1,867,938 | 7/1932 | Dalton | 192/43 |
| 2,614,670 | 10/1952 | Heintz | 192/45.1 |
| 2,859,362 | 11/1958 | Niblick | 192/51 |
| 3,165,183 | 1/1965 | Clements | 192/48.92 |
| 3,907,083 | 9/1975 | Nieder | 192/45.1 |
| 4,284,183 | 8/1981 | Brisabois et al. | 192/47 |

Primary Examiner—George H. Krizmanich
Attorney, Agent, or Firm—Tak Ki Sung

[57] ABSTRACT

A clutch-Brake device, comprising a drive shaft as a driving member, a ring having an inner periphery provided with a surface tapered in an axial direction and coaxially mounted on the drive shaft as a driven member, a plurality of wedges disposed around the drive shaft, each wedge being pivotally mounted on a fulcrum block installed on the inner periphery of the ring, the fulcrum blocks having a tapered surface slidably engaged with the inner peripheral surface of the ring and capable of causing the wedges to move radially toward and away from the drive shaft when the ring is moved axially in one direction or the other. The wedges are adapted to grip the drive shaft when the drive shaft is rotating in one direction and the wedges are moved to come into contact with the drive shaft, so that the ring is driven to rotate with the drive shaft, and to disengage the drive shaft when the drive shaft rotates in the opposite direction, or when the wedges are moved apart from the drive shaft. The device can be used as an one-way brake when the driven member is held stationary.

22 Claims, 15 Drawing Figures

CLUTCH-BRAKE DEVICE

BACKGROUND OF THE INVENTION

This invention relates to clutch-brake devices, more particularly to a clutch-brake device that transmits a rotary motion of one mechanical member to another in one direction.

For transmitting a rotary motion of one mechanical member to another in one direction there is a device conventionally known as a "free wheel clutch" or "ball clutch", such as is commonly used in bicycles, in which steel balls are arranged in between driving and driven members so as to engage the two members together by allowing the balls to be jammed therebetween when the driving member rotates in one direction, and to disengage the two from each other by freeing the balls when the driving member rotates in an opposite direction.

In such conventional device as described, the capacity, or the horsepower, or the torque the device is capable of transmitting, is quite limited because of the limited number of balls that can be arranged in the device.

Furthermore, conventional "free wheel clutches" are only capable of transmitting a rotary motion in one fixed direction. Moreover, there is no way to allow the disengagement of the driven member from the driving member when the driving member is rotating in the direction in which the driven member is driven.

In view of the aforesaid shortcomings of conventional "free wheel clutches," the present invention offers a novel clutch-brake device having a plurality of wedges capable of gripping a drive shaft rotating in one direction; wherein the comparatively smaller wedges permit the use of a greater number of wedges and thus the device is capable of transmitting comparatively larger horsepower or torque. The wedges are also capable of moving toward and away from the drive shaft thus providing an option of engaging and disengaging the driven member with respect to the driving member regardless of the direction of rotation.

Therefore, it is the main object of the present invention to provide a clutch device for transmitting a rotary motion in one direction that is capable of transmitting a comparatively large horsepower or torque.

It is another object of the present invention to provide a clutch-brake device for transmitting a rotary motion in one direction, wherein the direction of the rotary motion to be transmitted can be selected.

It is still another object of the present invention to provide a clutch-brake device for transmitting a rotary motion in one direction wherein the driven member can be selectively engaged or disengaged with respect to the driving member.

DETAILED DESCRIPTION OF THE INVENTION

Figure 1:
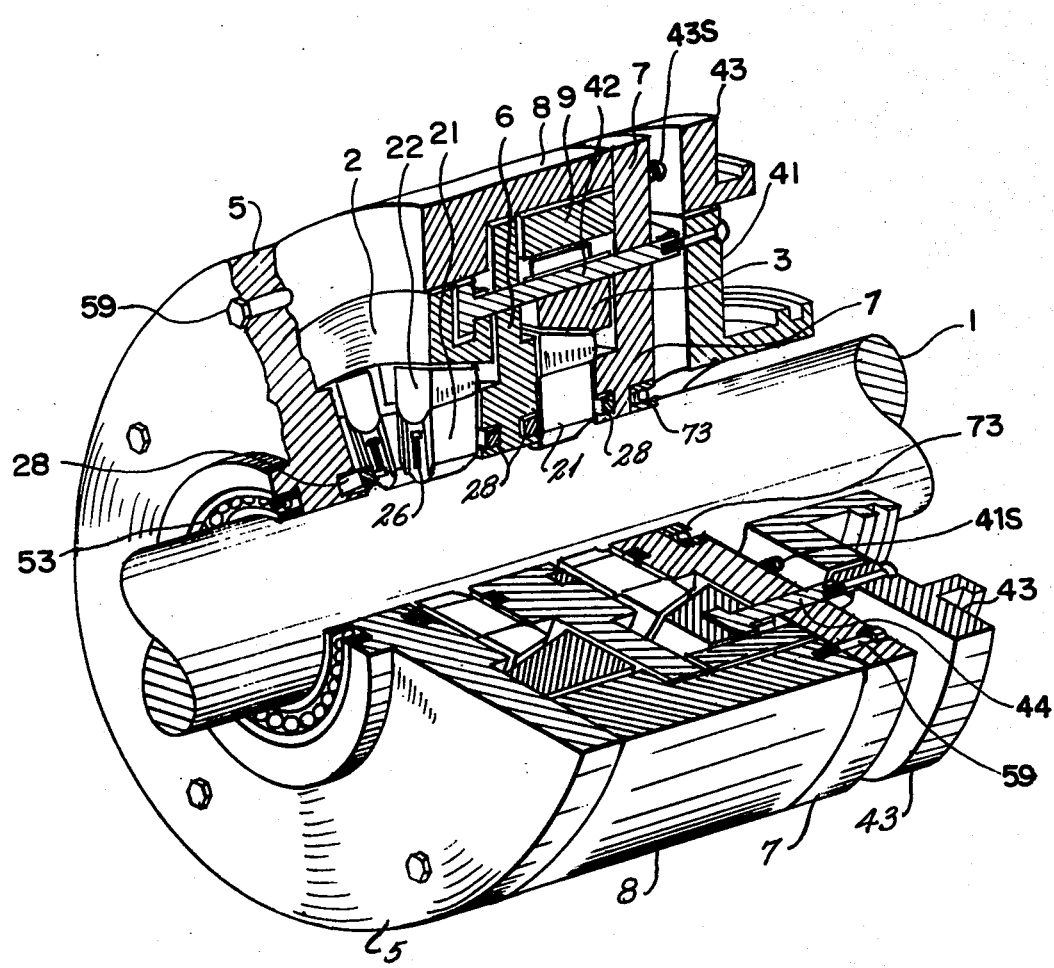
FIG. 1 is an oblique, perspective view of a first embodiment of the present invention, partially cut away.

In FIG. 1, there is shown a first embodiment of the clutch-brake device of this invention. It comprises a drive shaft 1, a first ring 2, a second ring 3, a first disc 5, a second disc 6, a third disc 7, an outer casing 8, an inner casing 9, an outer collar 43 and an inner collar 41; first and second rings 2 and 3 each having a plurality of wedges 21 and fulcrum blocks 22.

Drive shaft 1 is connected to a drive unit with a suitable coupling, not shown, and is referred to as a driving member.

First ring 2 and second ring 3 are each adapted to selectively transmit the rotary motion of drive shaft 1 through the plurality of wedges 21 and fulcrum blocks 22 and are referred to as driven members.

Figure 2:
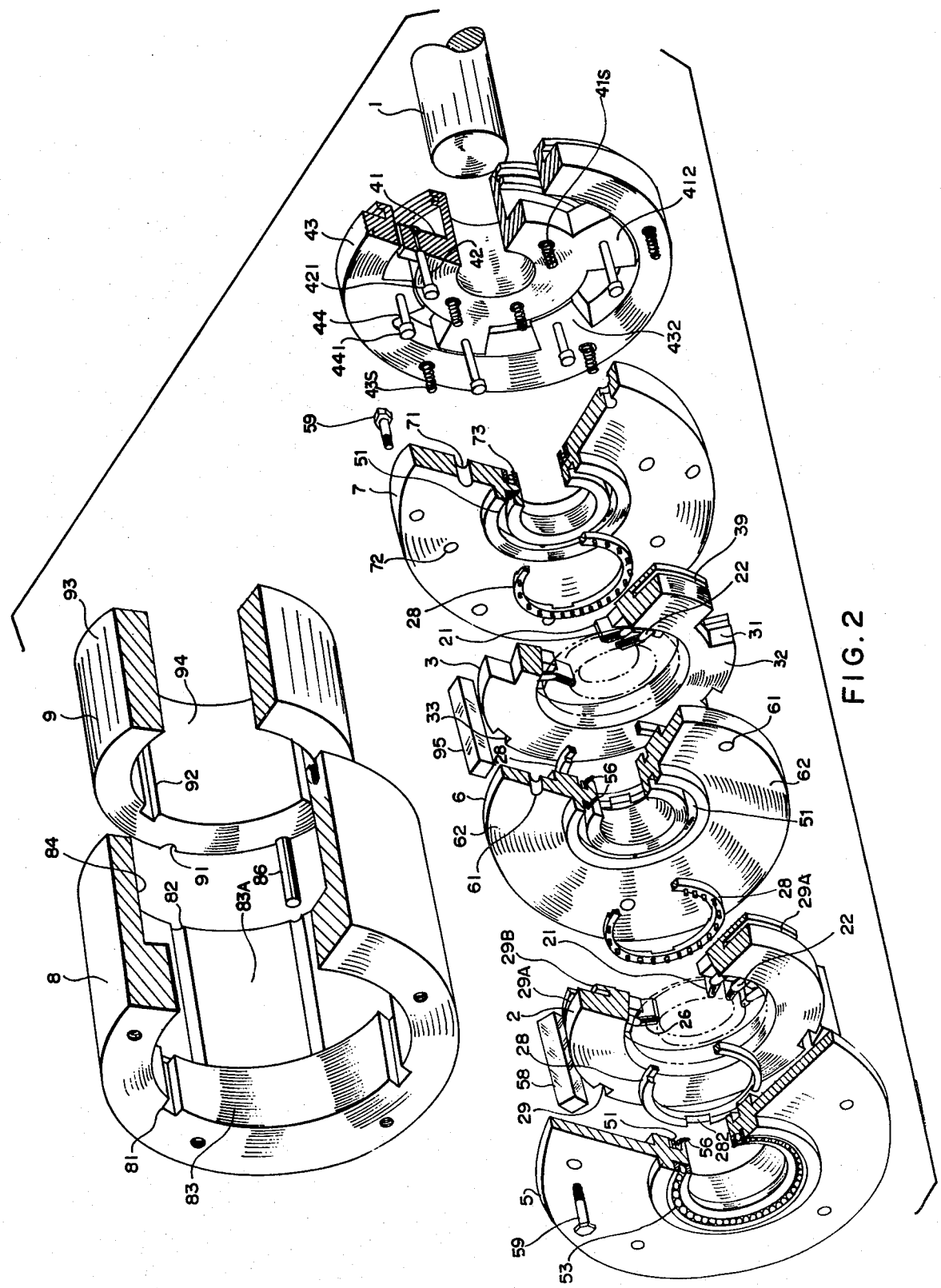
FIG. 2 is an exploded, oblique, perspective view of the first embodiment as shown in FIG. 1, with each component member partially cut away.

Referring now to FIG. 2, first disc 5 is rotatably mounted on drive shaft 1. A bearing member 53 is employed to keep first disc 5 from moving axially. First disc 5 is provided with annular groove 51 on an inner side thereof, in which a retaining ring 28, which will be described later, is slidably placed.

Figure 3:
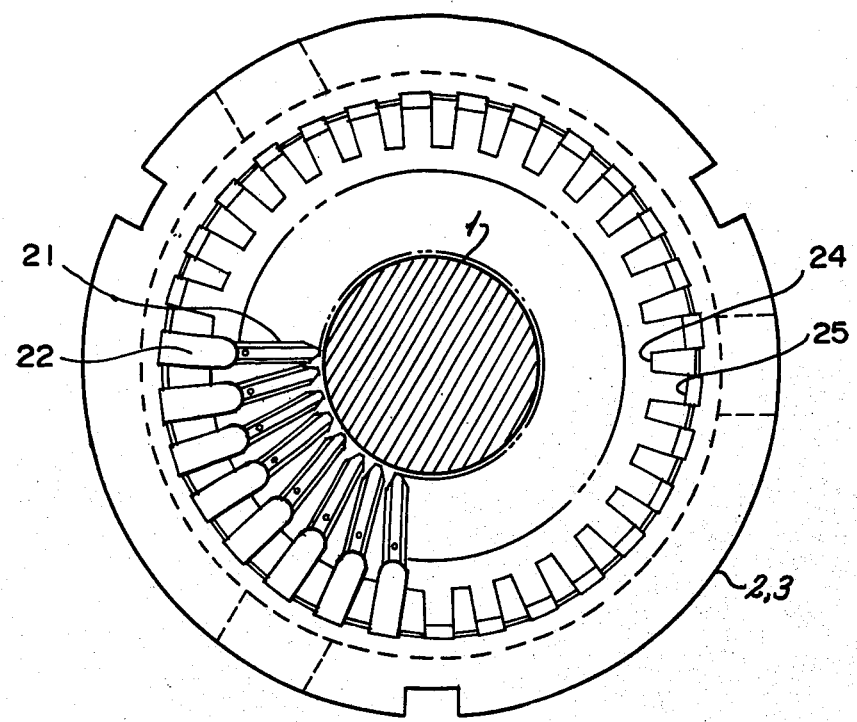
FIG. 3 is a schematic drawing showing the arrangement of wedges in the embodiment as shown in FIG. 1.
Figure 4:
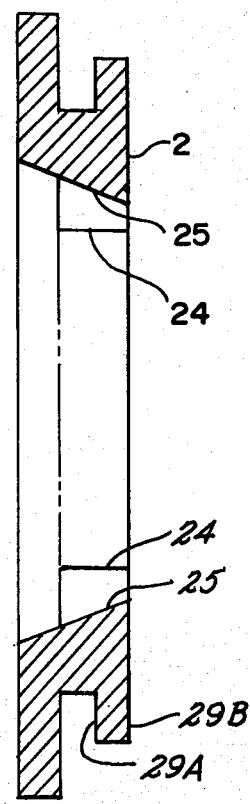
FIG. 4 is a cross sectional view of the driven member, or ring of the embodiment as shown in FIG. 1.

First ring 2 is provided with an inner periphery having a plurality of shoulders 24 thereround as shown in FIG. 3, and an inner surface 25 in between each of two shoulders, said inner surfaces 25 being tapered along the axial direction as shown in FIG. 4. Fulcrum blocks 22 are installed in the inner periphery of first ring 2, one in between each of two shoulders 24, each fulcrum block 22 having mounted thereon a wedge 21 as shown in FIG. 3, so as to surround drive shaft 1 with wedges 21.

Figure 6:
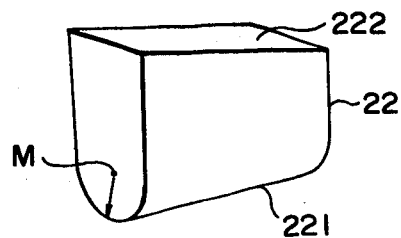
FIG. 6 is an enlarged, oblique, perspective view of the fulcrum block employed in the embodiment as shown in FIG. 1, showing top side down.

As shown in FIG. 6, fulcrum blocks are provided with a bottom 222 having a surface tapered along a longitudinal, or axial direction to cooperate with inner surface 25 of the inner periphery of the first ring 2, so that when there is a relative, axial movement between the fulcrum blocks 22 and first ring 2, fulcrum blocks 22 are moved radially toward or away from drive shaft 1. On the other end opposite the bottom 222 of fulcrum block 22 there is formed a round upper edge, or nose 221, having a center of curvature M as shown in the drawing, the nose 221 being adapted to pivotally receive wedge 21 thereon.

Figure 5:
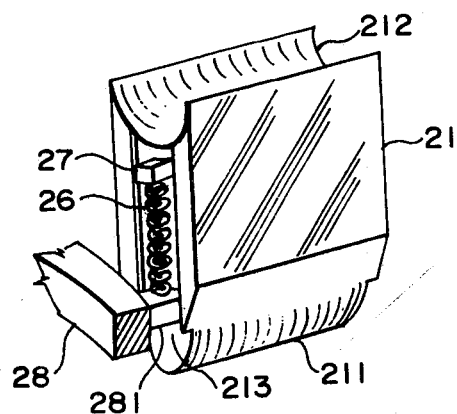
FIG. 5 is an enlarged, oblique, perspective view of the wedge employed in the embodiment as shown in FIG. 1, showing top side down.

Referring to FIG. 5, wedges 21 are formed with a convex upper edge 211 and an concave bottom 212, and a side groove 213 in each side. The concave bottom 212 is so formed to conform with nose 221 of fulcrum block 22 so that wedge 21 may pivot over nose 221 with respect to the center of curvature M. Wedges 21 are mounted on fulcrum blocks 22 as described above. In side grooves 213 there is provided a compression spring 26 having one end retained by a projection 27 formed in the groove 213 of the wedge and the other end retained by a projection 281 formed on the retaining ring 28 as shown in FIG. 5, so that wedges 21 are urged toward the fulcrum blocks 22. Projection 281 extends into groove 213 so that a predetermined position of wedges with respect to the retaining ring is maintained.

Figure 7:
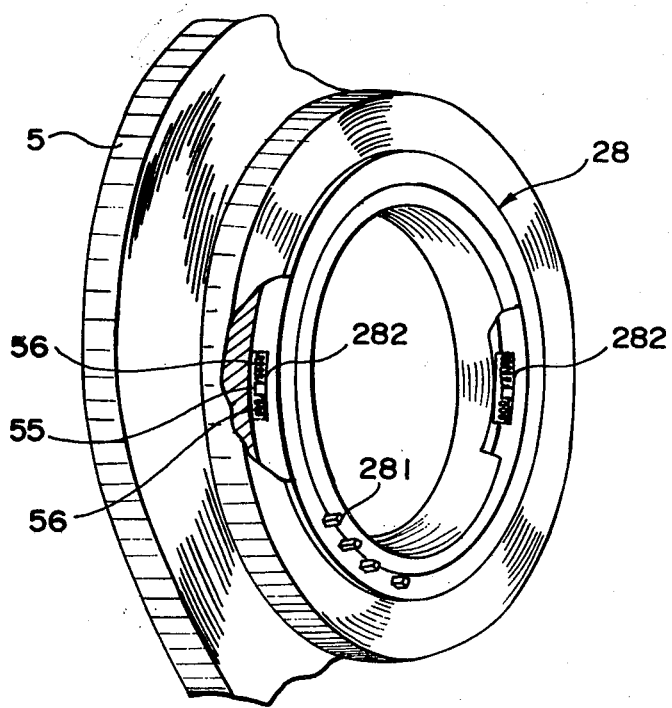
FIG. 7 is a fragmentary, oblique, perspective view of the retaining ring assembled with a disc.

Referring now to FIG. 7, retaining ring 28 is provided with a suitable number, for example 4, of cut-outs 282 on the side facing first disc 5, in which a stud 55 fixedly provided in annular groove 53 of first disc 5 is accomodated, stud 55 having a pair of springs 56 to resiliently maintain retaining ring 28 in a predetermined angular position, i.e. a working position with respect to first disc 5. Springs 56 allow retaining ring 28 to rotate a few degrees with respect to first disc 5. Therefore, when the retaining ring rotates a few degrees, all wedges 21 having projections 281 of retaining ring 28 extending into side grooves 213 pivot with respect to the respective fulcrum blocks.

Figure 8:
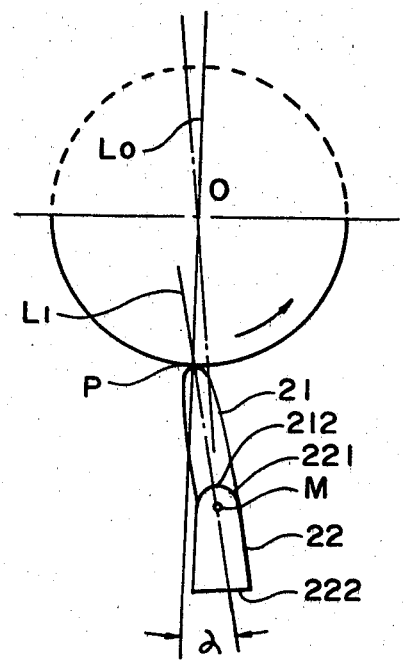
FIG. 8 is a schematic drawing showing the principle of the operation of the clutch-brake device of this invention.
Figure 10:
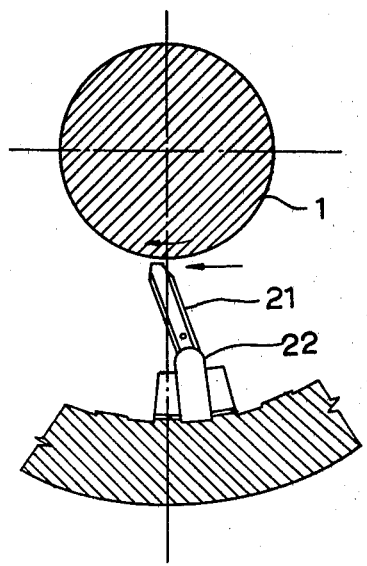
FIG. 10 is a second schematic drawing, showing the wedge releasing the drive shaft.
Figure 11:
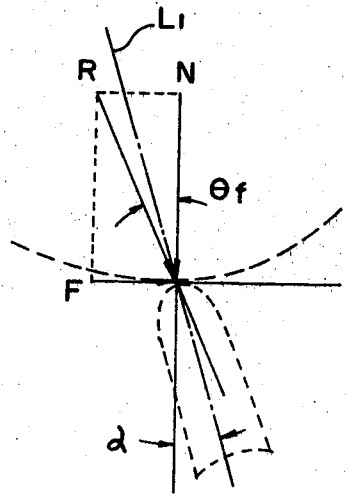
FIG. 11 is a force polygon showing the relationship between the frictional force and the angular position of the wedge with respect to the peripheral surface of the drive shaft.

Wedges 21 are so arranged that with retaining ring 28 in working position an angle of inclination $\alpha$ as shown in FIG. 8 is maintained. Angle of inclination $\alpha$ is defined by two lines $L_0$ and $L_1$ intercepted at point P of the upper edge 211 of wedge 21, wherein $L_0$ is a straight line defined by the center 0 of drive shaft 1 and the point P, which is a "normal line" perpendicular to the peripheral surface, and the line $L_1$ is a straight line, or an axis of the wedge, passing through the point P of the wedge and the center of curvature M of the nose of the fulcrum block on which the wedge is mounted. To assure that the clutch brake device operates without fail, the angle of inclination $\alpha$ is set to be about equal to but not greater than the "friction angle" $\theta_f$ of the peripheral surface of drive shaft 1 with respect to the upper edge 211 of wedges 21. (FIG. 11)

Referring back to FIGS. 1 and 2, first disc 5 is fixedly connected to outer casing 8 with bolts 59, outer casing 8 being keyed to first ring 2 as will be described below, so that the angular position of first disc 5 with respect to first ring 2 is fixed predeterminedly and yet an axial movement of first ring 2 with respect to first disc 5 is permitted. First ring 2 is also provided with an outer groove 29A around the outer periphery thereof with cutouts 29S for receiving the flange 421 of first push rods 42 to be described later.

The first ring 2, having a plurality of wedges 21 and fulcrum blocks 22 disposed therein as described above, is coaxially mounted on drive shaft 1 as shown in FIG. 1. A suitable number, for example three, of keyways 29 are formed on the outer periphery thereof for slidably receiving keys 58 to connect outer casing 8 thereto.

Second disc 6, having a same annular groove 51 and same retaining rings 28 in the grooves, on each side thereof is rotatably coaxially arranged on the inner side of the first ring 2, and is provided with three holes 61 (FIG. 2) equally spaced around, through which are inserted push rods 42 having one end formed with a flange 421 to be engaged with the outer groove 29A of first ring 2, and the other end to be fixed to an inner collar 41 to be described later. Second disc 6 is provided with outer flange portion 62 axially retained by outer casing 8 and inner casing 9 as shown in FIG. 1, so that its axial position is fixed.

Second ring 3 having an outer groove 39 is provided with the same shoulders 24, wedges 21, fulcrum blocks 22 and retaining rings 28 as the first ring 2, except that wedges 21 are so arranged to form an angle of inclination in an opposite direction with respect to the wedges in first ring 2 as will be explained later, and coaxially mounted next to second disc 6 on drive shaft 1. A suitable number, perhaps three, of keyways 33 are formed on the outer periphery thereof for receiving keys 95 with which the inner casing is connected thereto. The second ring 3 has a flange 32 provided with three cutouts 31 corresponding with the holes 61 in the second disc 6 so as to clear the way for push rods 42.

Third disc 7, having a same annular groove 51 in which a same retaining ring 28 is placed, is rotatably coaxially mounted next to the second ring 3 on drive shaft 1, and provided with three holes 71 corresponding to holes 61 in the second disc 6, and another three holes 72 each in between each two holes 71. Through holes 71 first push rods 42 and through holes 72 second push rods 44 respectively are slidably inserted. One end of second push rods 44 is provided with a flange 441 to be engaged with outer groove 39 of second ring 3, while the other end is fixed to an outer collar 43 to be described later. A bearing means 73 is provided in third disc 7 to prevent third disc 7 from moving axially. The third disc 7 is fixedly connected to outer casing 8 with bolts 59 as shown in FIG. 1.

On the outer side of third disc 7 an inner collar 41 and an outer collar 43 are coaxially arranged. The inner collar 41 is slidably mounted on drive shaft 1 and provided with three outwardly extending flanges 412 equally spaced around in which flanges 412 first push rods 42 are fixed. The outer collar 43 is slidably mounted over the inner collar 41, having inwardly extending flanges 432 disposed in between each two flanges 412 of the inner collar 41, in which flanges 442 second push rods 44 are fixed.

Inner collar 41 is adapted to be moved axially towards or away from third disc 7 by a suitable shifting device, not shown, so that first push rods 42 and first ring 2 may be axially push or pulled accordingly. The outer collar 43 is adapted to be moved axially towards or away from third discs 7 by another shifting device not shown, so that second push rods 44 and second ring 3 may be axially pushed or pulled accordingly.

Inner collar 41 and outer collar 43 are each provided with springs 41S and 43S respectively to facilitate the outward movements of the inner and outer collars or the outward movements of the first and second rings.

Outer casing 8, having first inner peripheral surface 83 provided with first keyways 81 to correspond with keyways 29 of first ring 2 and a second inner peripheral surface 83A provided with keyways 82, is mounted over first ring 2, second disc 6 and second ring 3 and is axially retained by first disc 5 and third disc 7. Inner casing 9, having an outer peripheral surface 93 provided with keyways 91 to correspond with the second keyways 82 of the outer casing 8, and an inner peripheral surface 94 provided with keyways 92 to correspond with keyways 33 of second ring 3, is disposed in between outer casing 8 and second ring 3, and is axially retained by first disc 5 through second disc 6 and outer casing 8, and third disc 7. Outer casing 8 is slidably mounted onto first ring 2 with keys 58 slidably inserted into keyways 81 and 29, and is also fixedly connected to the inner casing 9 with keys 86 tightly inserted in keyways 82 and 91. Inner casing 9 is slidably mounted onto second ring 3 with keys 95 slidably inserted into keyways 92 and 33. Therefore, first disc 5, first ring 2, second disc 6, second ring 3, third disc 7, inner collar 41 and outer collar 43, outer casing 8 and inner casing 9 are rotatable together as one integral unit.

The operation of the clutch device of this invention will now be described with reference to FIGS. 8 through 11. Since the construction of second ring 3 is identical to first ring 2 except for the direction of the inclination angle of the wedges, the operation of the device will be described with reference to first ring 2 by way of example.

Figure 9:
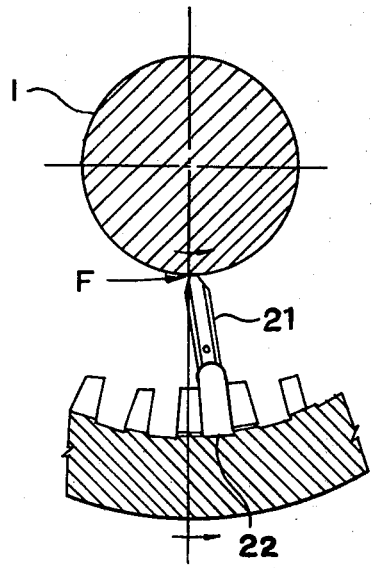
FIG. 9 is a schematic drawing, showing the wedge gripping the drive shaft.

Referring to FIGS. 8, 9 and 11, there are shown, schematically, drive shaft 1 rotating counterclockwise, and wedges 21 of first ring 2 having an angle of inclination in such direction that the wedges 21 tend to resist the rotary motion of drive shaft 1 when brought into contact with drive shaft 1, or hereinafter refered to as "against" the rotary motion. As previously described, wedges 21 may be moved toward or away from drive shaft by operating inner collar 41 axially inwardly or outwardly. As soon as wedges 21 are moved toward and brought into contact with drive shaft 1 rotating counterclockwise, a frictional force F is produced at the point of contact P. Frictional force F acts to force wedges 21 to rotate or pivot around the center of curvature M of the nose of fulcrum blocks 22 on which they are mounted, thus causing wedges 21 to be "jammed" in between drive shaft 1 and fulcrum blocks 22. In addition to the frictional force F there is formed at the point of contact a normal force N acting perpendicular to the peripheral surface of drive shaft 1, resulting in a resultant force R acting at an angle equivalent to the friction angle $\theta_f$, which acts to keep wedges 21 jammed since the angle of inclination $\alpha$ is equal to but not greater than the friction angle $\theta_f$ as described above. As a result wedges 21 are forced to "grip" drive shaft 1 and first ring 2 is engaged with drive shaft 1 so that they rotate together accordingly.

When inner collar 41 is operated to move axially outwardly to pull first ring along the same direction, a spacing is created between the inner and outer tapered surface of first ring 2 and fulcrum wedges 21 away from drive shaft 1 so as to disengage first ring 2 from drive shaft.

In the event drive shaft 1 rotates clockwise, or first ring 2, being fixedly connected to outer casing 8 which may be further coupled to an external load, rotates faster than drive shaft 1, the frictional force F reverses its direction and wedges 21 are allowed to pivot freely and thus relieve the "jamming"; as a result first ring 2 is disengaged from drive shaft 1.

The construction of second ring 3 is identical to that of first ring 2 except that the angle of inclination of the wedges in second ring 3 is in the opposite direction with respect to that in first ring 2. In other words, the angle of inclination of the wedges in second ring 3 is "along" the direction of the rotation of drive shaft while that in first ring 2 is "against", or vice versa.

Second ring 3 is operable with outer collar 43 to move axially while axial movement of wedges 21 are prohibited by second and third disc 6 and 7, so as to perform the same function as first ring 2 but in an opposite rotational direction.

Figure 12:
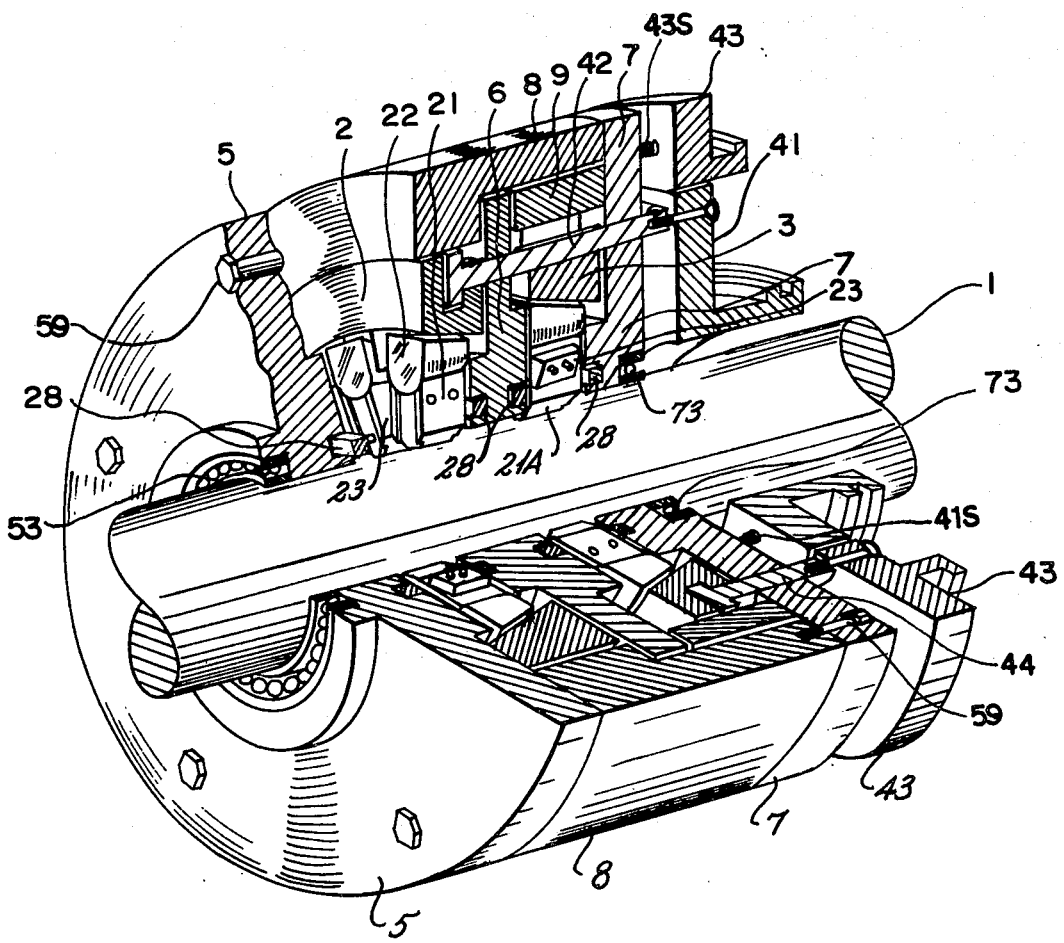
FIG. 12 is an oblique, perspective view of a second embodiment of the present invention, partially cut away.
Figure 13:
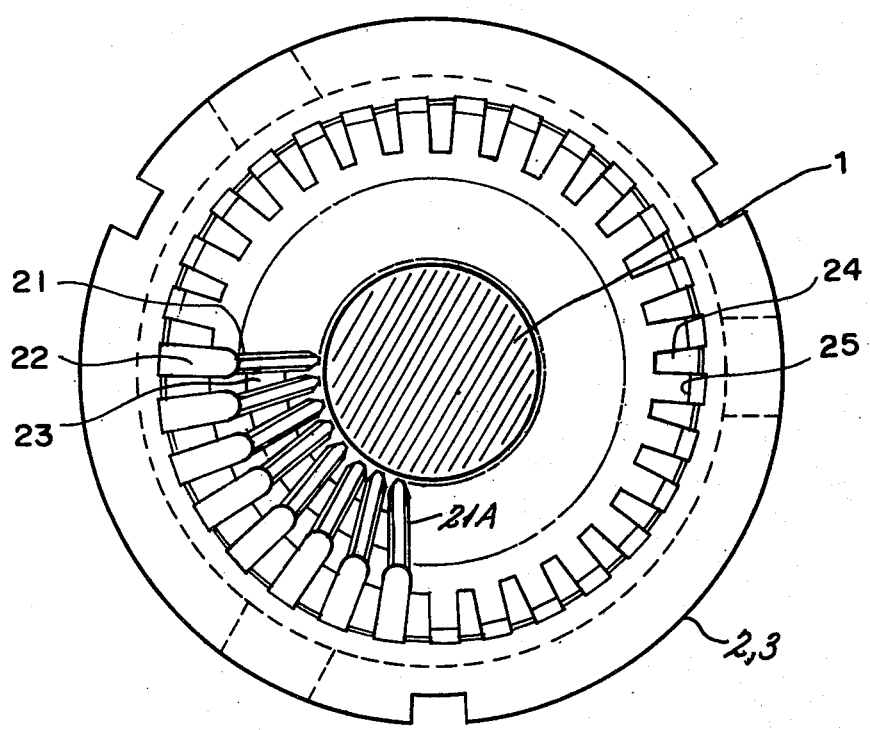
FIG. 13 is a schematic drawing showing the arrangement of the wedges and spacers in the second embodiment as shown in FIG. 12.
Figure 14:
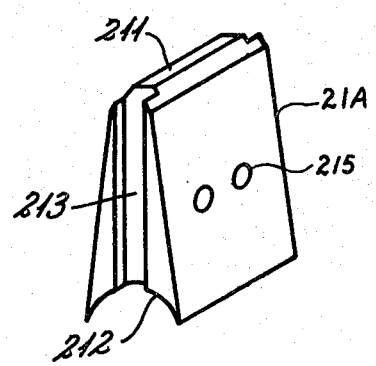
FIG. 14 is an oblique, perspective drawing of the wedge used in second embodiment.
Figure 15:
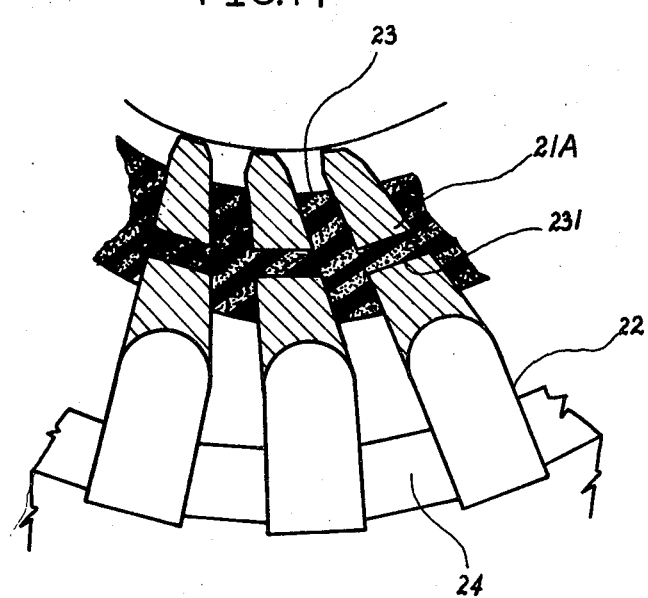
FIG. 15 is a schematic, cross-sectional drawing showing the formation of the spacers in the second embodiment.

A second embodiment of the clutch-brake device of this invention is shown in FIG. 12. In the second embodiment each wedge is formed with holes 215 as shown in FIGS. 13, and 14 and a spacer 23, made of a resilient material such as rubber, formed with extension 231 to pass through holes 215 of wedges 21A, in the space between each two adjacent wedges as shown in FIG. 15, so as to link wedges 21A together in a circle. Spacer 23 is so formed to resiliently keep wedges inclined at the angle of inclination $\alpha$ with respect to drive shaft 1, as in the first embodiment, and yet keeping wedges resiliently urged toward respective fulcrum blocks. Retaining rings 28 having projections 281 each corresponding to and extending in side groove 213 of wedges 21A are provided to operatively connect the wedges together so as to assure all wedges operate simultaneously and uniformly. Springs 26 and 56 as used in the first embodiment are eliminated in the second embodiment.

The clutch device of this invention as described above is capable of operating in several ways as follows:

With both inner and outer collars 41 and 43 are operated to move axially outwardly, all wedges 21A are moved radially outwardly and the rotary motion of the drive shaft will not be transmitted.

When both inner and outer collars 41 and 43 are operated to move axially inwardly, all wedges 21A are moved radially inwardly, and the rotary motion of the drive shaft will be transmitted by the first ring when the drive shaft rotates in one direction, and by the second ring when it rotates in the opposite direction.

When either the inner collar or outer collar is operated to move axially inwardly, the wedges in the corresponding first or second ring are moved radially inwardly and the rotary motion of the drive shaft is transmitted only in the designated direction.

The device of this invention may be used as a clutch where reciprocal rotary motion is to be transmitted into a one directional rotary motion, or where one does not want the driving member to be driven by the driven member. The device also can be used with the outer casing stationarily fixed as an automatic brake that allows a certain member to rotate in one direction but stops it when it tends to rotate in an opposite direction, and will be a useful device for replacing conventional hand brakes for motor vehicles.

To use the device of this invention as a hand brake for motor vehicles, outer casing 8 may be fixed by a suitable means, e.g., a brake band, and keeping either inner or outer collar in the inner position to keep either ring operative then the device becomes a one way automatic brake, which is quite useful when the vehicle is to start from stop on a slope. By properly operating inner or outer collar the vehicle can begin moving uphill in either forward or reverse direction from stop without rolling down the slope.

I claim:
1. A clutch device, comprising:
 (a) a rotary driving member having a longitudinal axis and a peripheral surface;
 (b) a circular driven member coaxially mounted over said driving member, having an inner periphery and outer periphery;
 (c) a plurality of wedges arranged around said rotary driving member, each wedge being pivotally mounted on a fulcrum block arranged on said inner periphery of said driven member and having a point of contact with said peripheral surface, a pivot center and a wedge axis passing through said point and said pivot center;

(d) resilient means for resiliently urging said wedges toward said fulcrum blocks and resiliently keeping said wedges in an angular relationship with said driving member so that said wedge axis forms an inclination angle at one side of a normal line passing through said point of contact and perpendicular to said peripheral surface of said driving member; and (e) wedge operating means provided with said circular driven member for moving said wedges toward and contacting said rotary driving member.

2. A clutch device as recited in claim 1, wherein said resilient means comprises a plurality of spacers made of resilient material each provided in between each two adjacent wedges, said spacers being connected together by extensions integrally formed therewith, said extensions passing through holes formed in said wedges so as to link said wedges around said driving member.

3. A clutch device as recited in claim 2, wherein said wedges are each provided with side grooves, and a retaining ring having a plurality of projections corresponding to said wedges, each projection extending in correspondence with side groove of respective wedges for operatively connecting the wedges so as to assure uniform and simultaneous movement of said wedges.

4. A clutch device as recited in claim 1, wherein:
(i) said circular driven member is provided with two disc members coaxially mounted on two opposite sides of said circular driven member, each disc member having an annular groove and a retaining ring slidably fitted in said annular groove,
(ii) said resilient means comprises compression springs each having one end retained by a projection formed on one side of said wedge and the opposite end retained by a projection formed on one side of said retaining ring, and pairs of springs each pair adapted to hold a projection formed on the opposite side of said retaining ring for resiliently keeping said retaining ring in a pre-determined angular relationship with said disc member.

5. A clutch device as recited in claim 1, wherein said wedge operating means comprises an inner surface formed on said inner periphery of said circular driven member, said inner surface being tapered with respect to said longitudinal axis, a tapered bottom surface formed on said fulcrum blocks, corresponding to and slidably engaged with said inner surface, and a collar member having push rods adapted to move said circular driven member in an axial direction.

6. A clutch device as recited in claim 1, wherein said circular driven member is provided with an outer casing mechanically connected therewith, said circular driven member being slidable with respect to said outer casing.

7. A clutch device as recited in claim 1, wherein a second circular driven member is coaxially mounted over said rotary driving member, said second driven member comprising a plurality of said wedges aand said resilient means, wherein said inclination angle is on the opposite side of said normal line.

8. A clutch device as recited in claim 7, wherein said resilient means comprises a plurality of spacers made of resilient material each provided in between each of two adjacent wedges, said spacers being connected together by extension integrally formed therewith, said extension passing through holes formed in said wedges so as to link said wedges around said driving member.

9. A clutch device as recited in claim 7, wherein said wedges are each provided with side grooves, and retaining rings having a plurality of projections corresponding to said wedges, each projection extending in correspondence with a side groove of a respective wedge for operatively connecting the wedges so as to assure uniform and simultaneous movement of said wedges.

10. A clutch device as recited in claim 7, wherein:
(i) said second circular driven member is provided with two disc members coaxially mounted on two opposite sides of said second circular driven member each disc member having an annular groove and a retaining ring slidably fitted in said annular groove,
(ii) said resilient means comprises compression springs each having one end retained by a projection formed on one side of said wedge and the opposite end retained by a projection formed on one side of said retaining ring, and pairs of springs, each pair being adapted to hold a projection formed on the opposite side of said retaining ring for resiliently keeping said retaining ring in a predetermined angular relationship with said disc member; and a second wedge operating means for moving said wedges toward and contacting said rotary driving members.

11. A clutch device as recited in claim 10, wherein said second wedge operating means comprises an inner surface formed on said inner periphery of said second circular driven member, said inner surface tapered with respect to said longitudinal axis, a tapered bottom surface formed on said fulcrum blocks corresponding to and slidably engaged with said inner surface, and a second collar member having push rods adapted to move said second circular driven member in an axial direction.

12. A clutch device as recited in claim 7, wherein said second circular driven member is provided with an outer casing mechanically connected therewith, said second circular driven member being slidable with respect to said outer casing.

13. A clutch-brake device, comprising:
(a) a rotary driving member having a longitudinal axis and a peripheral surface;
(b) a circular driven member coaxially mounted over said driving member, having an inner periphery and outer periphery;
(c) a plurality of wedges arranged around said rotary driving member, each wedge being pivotally mounted on a fulcrum block arranged on said inner periphery of said driven member and having a point of contact with said peripheral surface, a pivot center and a wedges axis passing through said point and said pivot center;
(d) resilient means for resiliently urging said wedges toward said fulcrum blocks and resiliently keeping said wedges in an angular relationship with said driving member so that said wedge axis forms an inclination angle at one side of a normal line passing through said point of contact and perpendicular to said peripheral surface of said driving member;

(e) wedge operating means provided with said circular driven member for moving said wedges toward and contacting said rotary driving member; and (f) a first casing member mechanically connected to said circular driven member which is axially slidable with respect to said casing member, said casing member being held stationary.

14. A clutch-brake device as recited in claim 13, wherein said resilient means comprises a plurality of spacers made of resilient material each provided in between each two adjacent wedges, said spacers being connected together by extensions integrally formed therewith, said extensions passing through holes formed in said wedges so as to link said wedges around said driving member.

15. A clutch-brake device as recited in claim 14, wherein said wedges are each provided with side grooves, and a retaining ring having a plurality of projections corresponding to said wedges, each projection extending in correspondence with side groove of respective wedges for operatively connecting the wedges so as to assure uniform and simultaneous movement of said wedges.

16. A clutch-brake device as recited in claim 13, wherein:
(i) said circular driven member is provided with two disc members coaxially mounted on two opposite sides of said circular driven member, each disc member having an annular groove and a retaining ring slidably fitted in said annular groove; and
(ii) said resilient means comprises compression springs each having one end retained by a projection formed on one side of said wedge and the opposite end retained by a projection formed on one side of said retaining ring, and pairs of springs each pair adapted to hold a projection formed on the opposite side of said retaining ring for resiliently keeping said retaining ring in a pre-determined angular relationship with said disc member.

17. A clutch-brake device as recited in claim 13, wherein said wedge operating means comprises an inner surface formed on said inner periphery of said circular driven member, said inner surface being tapered with respect to said longitudinal axis, a tapered bottom surface formed on said fulcrum blocks, corresponding to and slidably engaged with said inner surface, and a collar member having push rods adapted to move said circular driven member in an axial direction.

18. A clutch-brake device as recited in claim 13 wherein a second circular driven member is coaxially mounted over said rotary driving member, said second circular driven member comprising a plurality of said wedges and said resilient means, wherein said inclination angle is on the opposite side of said normal line.

19. A clutch-brake device as recited in claim 18, wherein said resilient means comprises a plurality of spacers made of resilient material each provided in between each of two adjacent wedges, said spacers being connected together by extension integrally formed therewith, said extension passing through holes formed in said wedges so as to link said wedges around said driving member.

20. A clutch-brake device as recited in claim 18, wherein said wedges are each provided with side grooves, and retaining ring having a plurality of projections corresponding to said wedges, each projection extending in correspondence with a side groove of a respective wedge for operatively connecting the wedges so as to assure uniform and simultaneous movement of said wedges.

21. A clutch-brake device as recited in claim 18, wherein
(i) said second circular driven member is provided with two disc members coaxially mounted on two opposite sides of said second circular driven member, each disc member having an annular groove and a retaining ring slidably fitted in said annular groove,
(ii) said resilient means comprises compression springs each having one end retained by a projection formed on one side of said wedge and the opposite end retained by a projection formed on one side of said retaining ring, and pairs of springs each pair being adapted to hold a projection formed on the opposite side of said retaining ring for resiliently keeping said retaining ring in a pre-determined angular relationship with said disc member,
(iii) a second operating means for moving said wedges of said second circular driven member toward and contacting said rotary driving member; and
(iv) a second casing member mechanically connected to said second circular driven member which is axially slidable with respect to said second casing member, said second casing member being mechanically connected to said first casing member.

22. A clutch-brake device as recited in claim 13 wherein said second wedge operating means comprises an inner surface formed on said inner periphery of said second circular driven member, said inner surface being tapered with respect to said longitudinal axis, a tapered bottom surface formed on said fulcrum blocks corresponding to and slidably engaged with said inner surface, and a second collar member having push rods adapted to move said second circular driven member in an axial direction.

* * * * *